UNITED STATES PATENT OFFICE.

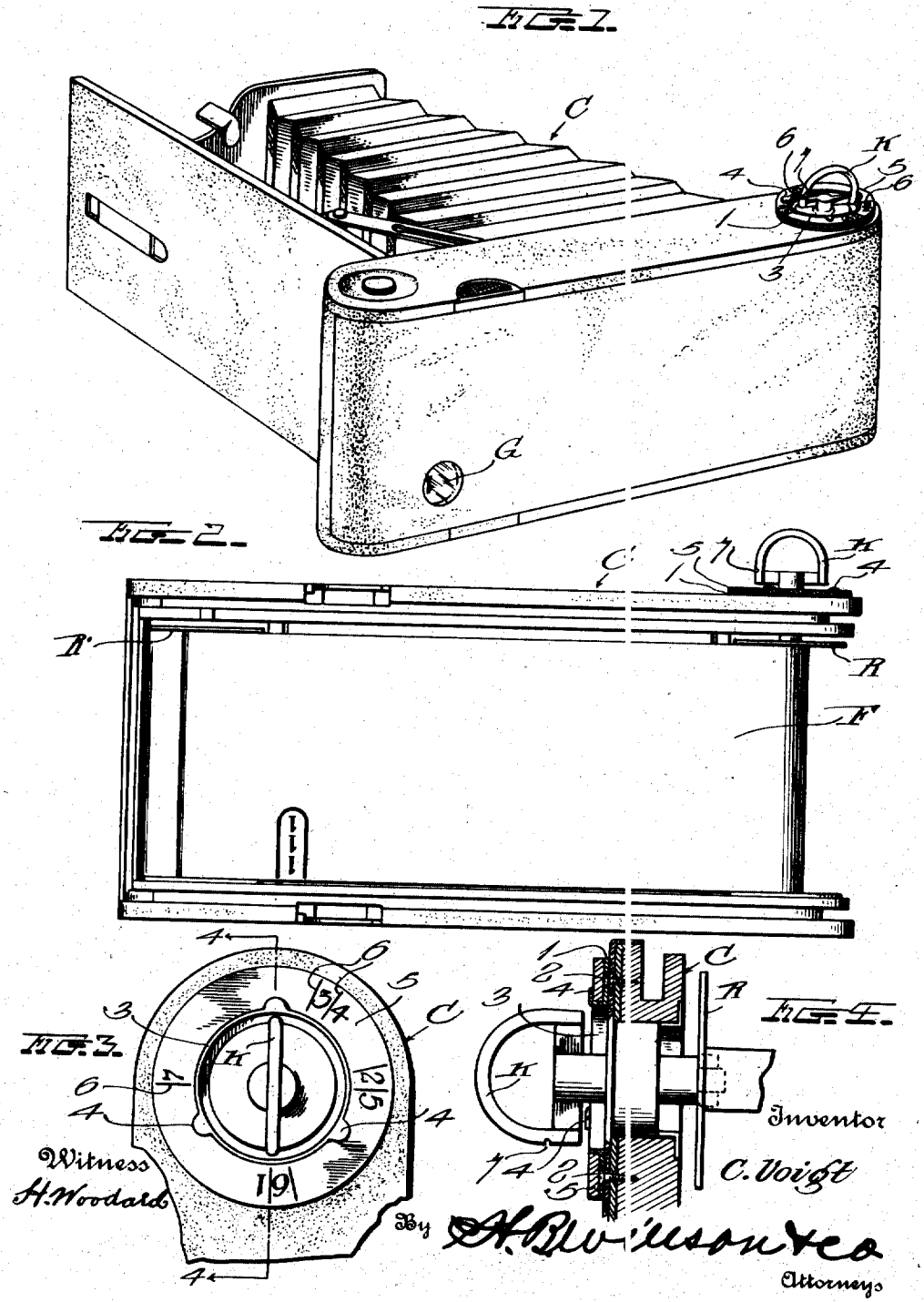

CHARLES VOIGT, OF SHEBOYGAN, WISCONSIN.

INDICATOR FOR CAMERAS.

1,216,631.  Specification of Letters Patent.  Patented Feb. 20, 1917.

Application filed May 13, 1916. Serial No. 97,277.

*To all whom it may concern:*

Be it known that I, CHARLES VOIGT, a citizen of the United States, residing at Sheboygan, in the county of Sheboygan and State of Wisconsin, have invented certain new and useful Improvements in Indicators for Cameras; and I do declare the following to be a full, clear, and exact description of the invention, such as will enable others skilled in the art to which it appertains to make and use the same.

My invention is an improved indicator for attachment to numerous types of cameras for permitting such accurate adjustment of the film as to allow a greater number of exposures to be made than is possible when adjusting said film according to the numbers imprinted on the backing thereof.

With this general object in view, the invention resides in certain novel features of construction and in unique combinations of parts to be hereinafter fully described and claimed, the descriptive matter being supplemented by the accompanying drawing which constitutes a part of this application, and in which:—

Figure 1 is a perspective view of a well known type of camera showing the application of the invention thereto;

Fig. 2 is a rear elevation of the camera with the back thereof removed;

Fig. 3 is an enlarged elevation of the indicator; and

Fig. 4 is a sectional view thereof taken on the plane of the line 4—4 of Fig. 3.

In the drawing above briefly described, C designates a camera of a well known type, while R and R' refer to the reels upon which the film F is wound, said film being adapted to be transferred from the reel R' to the reel R by rotation of the latter by the usual key K which projects beyond one side of the camera case. As above suggested, it is the intention of the present invention to provide an indicator by whose use the film may be so accurately adjusted as to prevent any waste thereof between the numerous exposures, and to this end, I have provided the structure now to be described.

An attaching ring 1 of sheet metal is secured by screws or the like 2 to the camera case around the key K, said ring having its inner edge struck laterally at right angles to its body portion to provide a flange 3 having claws 4 on its outer edge. A flat indicating ring 5 rotatably surrounds the flange 3 and contacts frictionally with said flange and with the ring 1, said indicating ring being held against removal by the claws 4 which are bent laterally into contact with the outer side of said ring as shown clearly in Figs. 3 and 4.

The outer face of the ring 5 is provided with any suitable indicating characters, but said characters are preferably in the form of radially extending lines 6 disposed in predetermined relation and having numbers equaling the number of exposures to be made on the film F. I have found that seven exposures may be made on the usual six exposure film and for illustrative purposes, the ring 5 is shown as equipped with seven lines 6 numbered from 1 to 7. However, these lines and the numbering thereof will increase or decrease according to the number of exposures which can be made on the film to be used.

In use the film is inserted in the usual manner and is wound until the numeral 1 on the film (see Fig. 1) partly appears through the ruby glass G in the camera back. The indicating ring 6 is then turned so that 1 is in line with the key K, using one end of this key as an indicator, for which purpose it is preferably notched as shown at 7 or otherwise marked. The camera is now ready for the first exposure. After this exposure is made, turn the key K twice past 1 on the ring 5 to 2. For the third exposure, turn the key twice past 2 to 3. For the fourth exposure, turn the key once past 3 to 4, and for all subsequent exposures, turn said key once past the number of the next exposure and to the next number on the ring 5. This operation will vary according to the style of camera upon which the device is applied and according to the length of film, but the main essentials of the invention are the same, and it will operate to great advantage for the purposes for which it is designed.

In the foregoing I have described certain specific details of construction for the attainment of probably the best results and in the drawing such details have been shown, but it is to be understood that within the scope of the invention as claimed numerous changes may be made without sacrificing the main advantages thereof.

I claim:

1. An indicator for application to cameras for accurately determining the amount to advance the film after each exposure, said indicator comprising a sheet metal attaching ring to be secured to the camera around the film winding key thereof, said ring having its inner edge bent laterally to form a flange having claws on its outer edge, and an indicating ring rotatably surrounding said flange, said claws being bent over said indicating ring to prevent removal thereof, said indicating ring having indicating characters thereon and being adapted to be set before the first exposure of the film to dispose said characters in predetermined relation with the key, whereby all subsequent adjustments of the film may be accurately made.

2. An indicator for application to cameras for accurately determining the amount to advance the film after each exposure, said indicator comprising a flat sheet metal ring to be secured to the camera around the film winding key thereof, said ring having its inner edge bent outwardly to form a flange, and an indicating ring rotatably surrounding said flange and held against removal therefrom, said indicating ring having exposure indicating characters thereon and being adapted to be set before the film is adjusted for each succeeding exposure.

3. The combination with a camera having a film winding key; of an indicating ring surrounding said key and rotatable manually independently thereof, said ring having thereon indicating characters and being adapted to be set before the film is adjusted for each succeeding exposure to dispose said characters in predetermined relation with the key.

In testimony whereof I have hereunto set my hand in the presence of two subscribing witnesses.

CHARLES VOIGT.

Witnesses:
NILS TYRLSON,
LEO H. KALK.

Copies of this patent may be obtained for five cents each, by addressing the "Commissioner of Patents, Washington, D. C."